United States Patent
Jeong et al.

(10) Patent No.: US 9,240,574 B2
(45) Date of Patent: Jan. 19, 2016

(54) SECONDARY BATTERY AND METHOD FOR MANUFACTURING THE SAME

(71) Applicant: LG CHEM, LTD., Seoul (KR)

(72) Inventors: Yi-Heon Jeong, Daejeon (KR); Chan-Sub Lee, Daejeon (KR); Soon-Ho Ahn, Daejeon (KR); Kyoung-Won Kang, Daejeon (KR); Ki-Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/185,608

(22) Filed: Feb. 20, 2014

(65) Prior Publication Data

US 2014/0170470 A1 Jun. 19, 2014

Related U.S. Application Data

(63) Continuation of application No. PCT/KR2013/004720, filed on May 29, 2013.

(30) Foreign Application Priority Data

May 29, 2012 (KR) .......... 10-2012-0056800
May 29, 2013 (KR) .......... 10-2013-0061010

(51) Int. Cl.
*H01M 10/04* (2006.01)
*H01M 2/02* (2006.01)
(Continued)

(52) U.S. Cl.
CPC ............ *H01M 2/021* (2013.01); *H01M 2/0212* (2013.01); *H01M 10/0436* (2013.01);
(Continued)

(58) Field of Classification Search
CPC . H01M 10/04; H01M 10/42; H01M 10/0431; H01M 10/045; H01M 10/0565; H01M 2300/0085; H01M 10/0585; H01M 2/0212; H01M 10/058; H01M 10/4235; H01M 10/0436; H01M 2/021; H01M 10/0567; Y10T 29/49115
USPC ............ 29/623.1, 623.2, 623.3, 623.4, 623.5; 429/163, 167, 176, 300, 303
See application file for complete search history.

(56) References Cited

U.S. PATENT DOCUMENTS 6,743,546 B1 * 6/2004 Kaneda et al. ................. 429/127
6,852,138 B1 * 2/2005 Topsoe et al. ................ 29/623.1
(Continued)

FOREIGN PATENT DOCUMENTS

CN 102324457 A 1/2012
JP 11-283672 A 10/1999
(Continued)

OTHER PUBLICATIONS

International Search Report, issued in PCT/KR2013/004720, dated Sep. 2, 2013.
(Continued)

*Primary Examiner* — Jonathan Jelsma
*Assistant Examiner* — Omar Kekia
(74) *Attorney, Agent, or Firm* — Birch, Stewart, Kolasch & Birch, LLP

(57) ABSTRACT

Provided is a secondary battery with improved safety through filling a polymer in a hardened state, and a method of manufacturing the same. The method of manufacturing a secondary battery according to the present disclosure includes preparing a polymer slurry by adding a polymer particle to an electrolyte solution, injecting the polymer slurry to a battery casing in which an electrode assembly is received, changing the polymer slurry to a polymer solution by heating the battery casing, and hardening the polymer solution by cooling the battery casing.

9 Claims, 7 Drawing Sheets

(51) Int. Cl.
*H01M 10/0565* (2010.01)
*H01M 10/058* (2010.01)
*H01M 10/0585* (2010.01)
*H01M 10/0567* (2010.01)
*H01M 10/42* (2006.01)

(52) U.S. Cl.
CPC ........ *H01M10/058* (2013.01); *H01M 10/0565* (2013.01); *H01M 10/0567* (2013.01); *H01M 10/0585* (2013.01); *H01M 10/4235* (2013.01); *H01M 10/04* (2013.01); *H01M 10/42* (2013.01); *H01M 2300/0085* (2013.01); *Y10T 29/49115* (2015.01)

(56) References Cited

U.S. PATENT DOCUMENTS

| | | | |
|---|---|---|---|
| 7,718,306 | B2 | 5/2010 | Cheon et al. |
| 2001/0038948 | A1* | 11/2001 | Jacobs ................ 429/304 |
| 2003/0148174 | A1 | 8/2003 | Gu |
| 2003/0170545 | A1 | 9/2003 | Coowar et al. |
| 2003/0194607 | A1* | 10/2003 | Huang ................ 429/176 |
| 2007/0154787 | A1* | 7/2007 | Jang et al. ........... 429/94 |
| 2010/0143787 | A1 | 6/2010 | Jung et al. |
| 2013/0330606 | A1 | 12/2013 | Kwon et al. |

FOREIGN PATENT DOCUMENTS

| | | |
|---|---|---|
| JP | 2002-270236 | 9/2002 |
| JP | 2002-280071 A | 9/2002 |
| JP | 2010-055987 A | 3/2010 |
| KR | 10-2002-0018393 A | 3/2002 |
| KR | 10-2008-0041113 A | 5/2008 |
| KR | 10-2012-0014540 A | 2/2012 |
| WO | WO 01/97316 A1 | 12/2001 |

OTHER PUBLICATIONS

Written Opinion of the International Searching Authority, issued in PCT/KR2013/004720, dated Sep. 2, 2013.
Korea Office Action for Appl. No. 10-2013-0061010 dated Apr. 29, 2014 (w/ English translation).

* cited by examiner

SECONDARY BATTERY AND METHOD FOR MANUFACTURING THE SAME

CROSS-REFERENCE TO RELATED APPLICATION

The present application is a continuation of International Application No. PCT/KR2013/004720 filed on May 29, 2013, which claims priority under 35 USC 119(a) to Korean Patent Application No. 10-2012-0056800 filed on May 29, 2012 in the Republic of Korea and Korean Patent Application No. 10-2013-0061010 filed on May 29, 2013 in the Republic of Korea, the disclosures of which are incorporated herein by reference.

TECHNICAL FIELD

The present disclosure relates to a technology for manufacturing a secondary battery, and more particularly, to a secondary battery that may improve mechanical safety and prevent a short circuit of an electrode assembly by including a polymer in a solid or gel state as well as an electrolyte solution in a liquid state within a battery casing, and a manufacturing method thereof.

BACKGROUND ART

Generally, a secondary battery is designed to be recharged dissimilar to a non-rechargeable primary battery, and has a wide range of applications, for example, electronic devices including mobile phones, lap-top computers and camcorders, electric vehicles, and the like. In particular, a lithium secondary battery has an operating voltage of about 3.6V and a capacity about three times higher than a Ni—Cd battery or Ni-MH battery which is widely used as a power source of electronic equipments, as well as a high energy density per unit weight, and thus its extent of utilization is showing a fast growing tendency.

Such a lithium secondary battery mainly uses lithium-based oxide and a carbon material as a cathode active material and an anode active material, respectively. A lithium secondary battery includes an electrode assembly consisting of a cathode plate coated with the cathode active material, an anode plate coated with the anode active material, and a separator interposed therebetween, and an outer casing to sealingly receive the electrode assembly therein along with an electrolyte solution.

Meanwhile, a lithium secondary battery may be classified, based on a shape of a battery casing, into a can-shaped secondary battery in which an electrode assembly is embedded in a metal casing and a pouch-shaped secondary battery in which an electrode assembly is embedded in a pouch of an aluminum laminate sheet.

A secondary battery is generally manufactured by injecting an electrolyte in a liquid state, that is, an electrolyte solution, in such a state that an electrode assembly is received in a battery casing, and by sealing the battery casing.

FIG. 1 is a cross sectional view of a conventional pouch-shaped secondary battery when viewed from the front, and FIG. 2 is a cross sectional view of section A of FIG. 1 when viewed from the side.

Referring to FIGS. 1 and 2, generally, a secondary battery has such a configuration that an electrode assembly 10 and an electrolyte solution are received in an internal space of a battery casing 20. The electrode assembly 10 includes a cathode plate and an anode plate with a separator interposed therebetween, and each of the cathode plate and the anode plate has an electrode tab 11 attached thereto. Also, the electrode tabs 11 are received in the internal space of the electrode casing 20 indicated by section V in the drawing in such a state that the electrode tabs 11 are connected to electrode leads 12. However, conventionally, connections of the electrode tabs 11 and the electrode leads 12 are made in a curved state in a shape of a letter V, as shown in FIG. 2, to reduce a space occupied thereby. For this reason, a space occupied by connected portions of the electrode tabs 11 and the electrode leads 12 in the battery casing 20 are referred to as a V-forming space.

However, the electrode assembly 10 may be moveable due to the presence of an empty space inside the battery casing 20 such as a V-forming space. When the electrode assembly 10 moves, the electrode tabs 11, the electrode leads 12, and their connected portions may be damaged, and moreover, the electrode assembly 10 itself may be damaged.

Further, when the electrode tabs 11 are cut off due to the movement of the electrode assembly 10, the cut-off portion may come into contact with an electrode plate of opposite polarity to cause an internal short circuit, which in this case, may lead to a grave issue, for example, an accident such as heat generation, a fire, or explosion of the secondary battery.

DISCLOSURE

Technical Problem

The present disclosure is designed to solve the problems of the related art, and therefore the present disclosure is directed to providing a secondary battery with improved safety in which an empty space inside the battery casing 20, in particular, a V-forming space, is filled with a polymer in a hardened state, such as a gel polymer, and a manufacturing method thereof.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Technical Solution

To achieve the above object, a method of manufacturing a secondary battery according to the present disclosure includes preparing a polymer slurry by adding a polymer particle to an electrolyte solution, injecting the polymer slurry to a battery casing in which an electrode assembly is received, changing the polymer slurry to a polymer solution by heating the battery casing, and hardening the polymer solution by cooling the battery casing.

Preferably, heating and cooling of the battery casing is performed in such a state that a predetermined pressure is applied to the battery casing.

Also, preferably, cooling of the battery casing is performed to change the polymer solution to a gel state.

To achieve the above object, a secondary battery according to the present disclosure includes an electrode assembly including a cathode plate and an anode plate with a separator interposed therebetween, an electrolyte solution, a battery casing to receive the electrode assembly and the electrolyte solution in an internal space thereof, and a hardened polymer solution filled in between an inner surface of the battery casing and the electrode assembly within the internal space of the battery casing.

Preferably, the hardened polymer solution is filled in a protruding portion of an electrode tab of the electrode assembly within the battery casing.

Also, preferably, the hardened polymer solution is filled in a protruding portion of an electrode tab of the electrode assembly within the battery casing.

Advantageous Effects

According to the present disclosure, an empty space of a battery casing, in particular, a V-forming space where an electrode tab is connected to an electrode lead may be filled with a polymer in a hardened state, such as a polymer in a gel state.

Accordingly, movement of an electrode assembly may be prevented, so that damages of the electrode assembly and the electrode tab may be prevented, connection of the electrode tab and the electrode lead may be stably maintained, and the electrode tab and the electrode lead may be protected from an external impact.

Also, when the electrode tab is damaged, an internal short circuit may be prevented from occurring when the damaged electrode tab comes into contact with a tab or electrode plate of opposite polarity.

Additionally, contact of a cathode plate and an anode plate caused by shrinkage of a separator and the like may be prevented by the hardened polymer solution filled in the V-forming space and other areas fixing the separator protruding beyond the cathode plate and the anode plate.

Accordingly, according to the present disclosure, safety of a secondary battery may be greatly improved.

DESCRIPTION OF DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
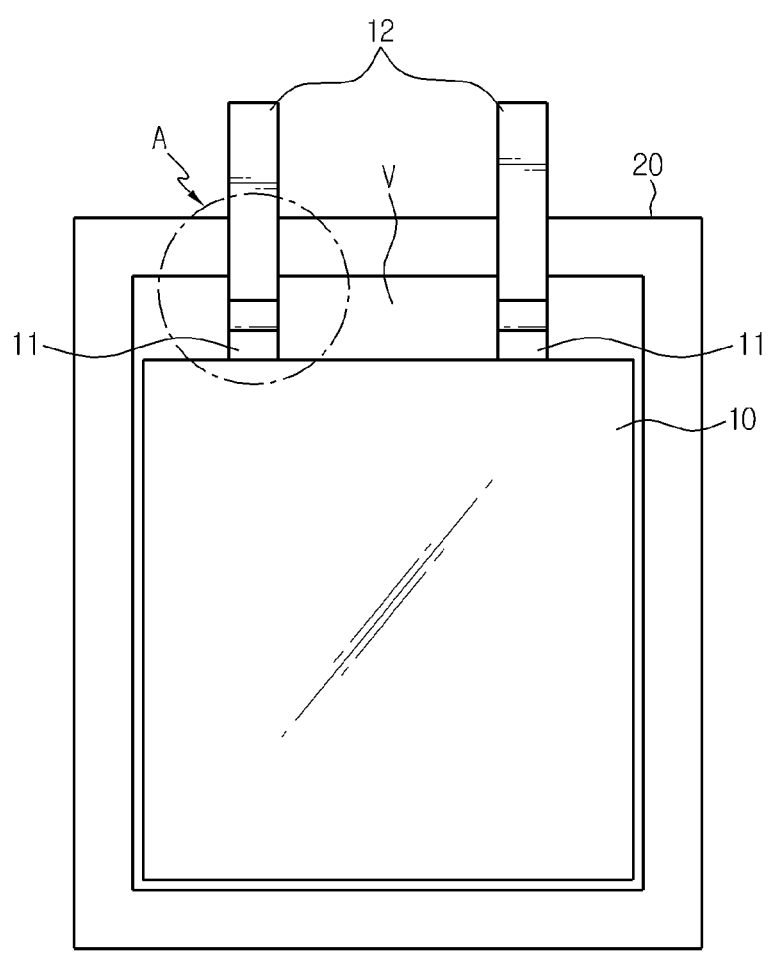
FIG. 1 is a cross sectional view of a conventional pouch-shaped secondary battery when viewed from the front.
Figure 2:
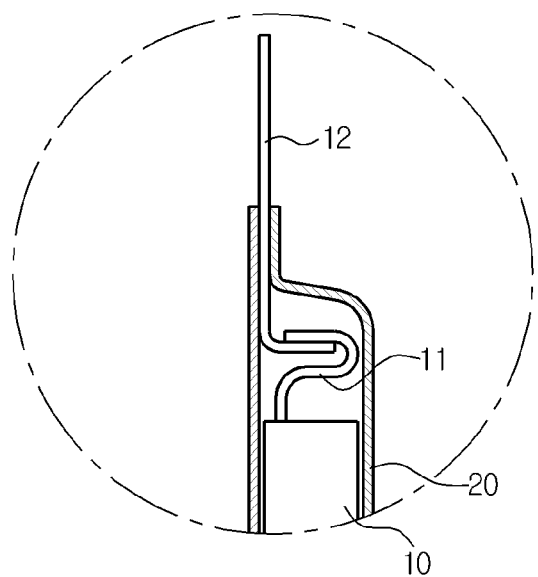
FIG. 2 is a cross sectional view of section A of FIG. 1 when viewed from the side.
Figure 3:
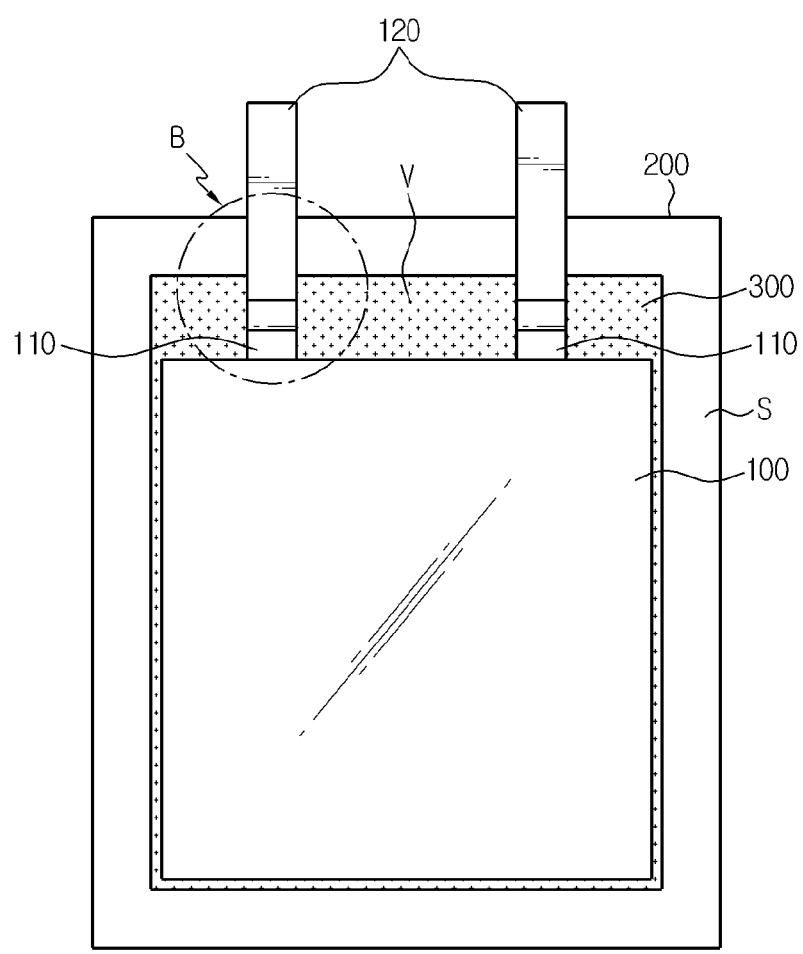
FIG. 3 is a cross sectional view schematically illustrating a configuration of a secondary battery according to an exemplary embodiment of the present disclosure.
Figure 4:
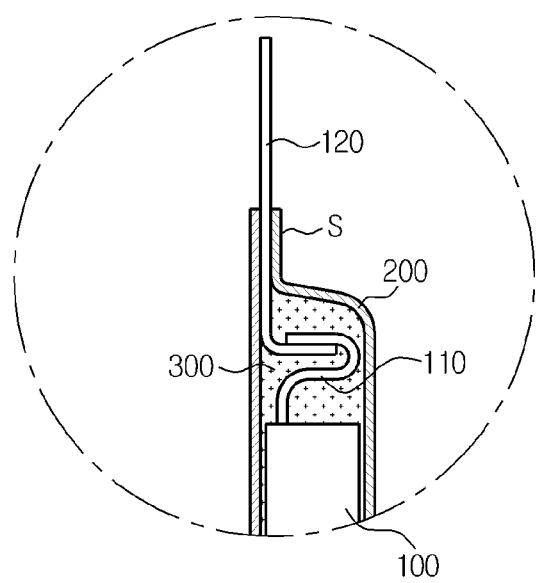
FIG. 4 is a cross sectional view of section B of FIG. 3 when viewed from the side.

FIG. 3 is a cross sectional view schematically illustrating a configuration of a secondary battery according to an exemplary embodiment of the present disclosure, and FIG. 4 is a cross sectional view of section B of FIG. 3 when viewed from the side.

Referring to FIGS. 3 and 4, the secondary battery according to the present disclosure includes an electrode assembly 100, an electrolyte solution, a battery casing 200, and a hardened polymer solution 300.

The electrode assembly 100 is received in a battery casing in such a state that at least one cathode plate and at least one anode plate are provided with a separator interposed therebetween. In this instance, the electrode assembly 100 may be received in the battery casing 200 in such a state that a plurality of cathode plates and a plurality of anode plates are stacked, or may be received in the battery casing 200 in such a state that one cathode plate and one anode plate are wound. The electrode plates of the electrode assembly 100 are formed in such a structure that a current collector is coated with an active material slurry, and the slurry may be generally prepared by agitating a particulate active material, an auxiliary conductor, a binder, and a plasticizer after adding a solvent thereto. Each of the electrode plates may have a non-coated part, i.e., a part that is not coated with the slurry, and the electrode tabs 110 corresponding to each electrode plate may be attached to the non-coated part.

The electrode tab 110 is attached to each of the cathode plate and the anode plate, and is configured in a protruding shape coming out of the electrode assembly 100. Also, the electrode tab 110 may be connected, in a curved state, to the electrode lead 120 in an internal space of the battery casing 200, a so-called V-forming space indicated by V in FIG. 3. Here, the V-forming space refers to an internal space of the electrode casing 200 in which at least one electrode tab 110 protrudes from the electrode assembly 100 and connects to the electrode lead 120, and is named from a morphological feature that the electrode tab 110 is bent in a shape of a letter V to reserve the space.

Meanwhile, although FIG. 4 shows only one electrode tab 110, this is just an example, and a plurality of electrode tabs 110 may protrude from the electrode assembly 100 and connect to the electrode leads 120.

The electrode lead 120 is connected to at least one electrode tab 110 by various methods such as welding and the like, and protrudes out of the battery casing 200 to form an electrode terminal.

Meanwhile, although FIG. 3 shows that two electrode leads 120, that is, a cathode lead and an anode lead, protrude in the same direction, this is just an example, and the present disclosure is not limited thereto. For example, the cathode lead and the anode lead may protrude in opposite directions of the battery casing 200.

The electrolyte solution refers to an electrolyte in a liquid state, and enables an ion to move between the cathode plate and the anode plate. Also, the secondary battery may perform charging and discharging through ion exchange between the cathode plate and the anode plate. Generally, a non-aqueous electrolyte solution is widely used in a lithium secondary battery.

An electrolyte solution usable in an electrochemical device according to an aspect of the present disclosure may be an electrolyte solution in which a salt of A+B− structure, where A+ represents an ion including an alkali metal cation such as Li+, Na+ and K+, or combinations thereof, and B− represents an ion including an anion such as $PF_6{-}$, $BF_4{-}$, Cl−, Br−, I−, $ClO_4{-}$, $AsF_6{-}$, $CH_3CO_2{-}$, $CF_3SO_3{-}$, $N(CF_3SO_2)_2{-}$ and $C(CF_2SO_2)_3{-}$, or combinations thereof, is dissolved or dissociated in an organic solvent including propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone (γ-butyrolactone), or mixtures thereof, however the present disclosure is not limited thereto.

This electrolyte solution is well known to an ordinary person skilled in the art pertaining to the present disclosure, and thus a detailed description is omitted herein. Also, the present disclosure may employ various electrolyte solutions known at the time of filing an application for the invention as the electrolyte solution of the present disclosure.

The battery casing 200 has an internal space in which the electrode assembly 100 and the electrolyte solution are received.

Preferably, the battery casing 200 may be a pouch-shaped battery casing 200 as shown in FIGS. 3 and 4. That is, the battery casing 200 may be formed by sealing an upper pouch and a lower pouch together at a sealing portion S, so that an internal space may be formed in the upper pouch and/or the lower pouch and may accommodate the electrode assembly 100, the electrolyte solution, and the hardened polymer solution 300.

As described in the foregoing, when the battery casing 200 corresponds to the pouch-shaped battery casing 200, a process of applying pressure to the battery casing 200 may be eased so that an empty space inside the battery casing 200 such as a V-forming space may be favorably filled with the polymer added to the electrolyte solution, and its detailed description will be provided below.

However, the present disclosure is not limited by a specific shape of the battery casing 200 described in the foregoing, and the battery casing 200 having a different shape, for example, a shape of a can made from a metal material, may be used.

The hardened polymer solution 300 may be filled in a portion in which the electrode assembly 100 is absent among the internal space of the battery casing 200. As the battery casing 200 has a space inside in which the electrode assembly 100 and the electrolyte solution are received, a predetermined gap may be present between the inner surface of the battery casing 200 and the electrode assembly 100. The hardened polymer solution 300 may be filled in between the inner surface of the battery casing 200 and the electrode assembly 100.

Here, the term 'hardened' implies a state in which it becomes hard, and does not necessarily represent only a solid state in which it is completely solidified, and defines a broad concept including a state in which it does not flow and maintains a shape, in the same manner as a gel or the like. That is, if a polymer solution in a liquid state becomes hard and loses properties as a liquid, such a state may refer to the hardened polymer solution 300. Also, the term 'hardened' may be interchangeably used with the term 'solidified' or 'gelled'.

Preferably, the hardened polymer solution 300 may be a polymer solution in a gel state. That is, in the secondary battery of the present disclosure, the gel polymer may be filled in between the electrode assembly 100 and the inner part of the battery casing 200, together with the electrode assembly 100 and the electrolyte solution.

Meanwhile, 'filling' does not necessarily imply completely filling an empty space between the battery casing 200 and the electrode assembly 100, and may include filling while leaving empty in some parts.

As described in the foregoing, when the hardened polymer solution 300 is filled in a space between the inner surface of the battery casing 200 and the electrode assembly 100, such a space may prevent the electrode assembly 100 from moving. Therefore, according to the present disclosure, breakage or damage of the electrode assembly 100 or the electrode tab 110 caused by the movement of the electrode assembly 100 may be suppressed.

Also, in the electrode assembly 100, the separator generally protrudes beyond the cathode plate or the anode plate, and in the present disclosure, the hardened polymer solution 300 filled outside the electrode assembly 100 may serve to hold the separator. Accordingly, shrinkage of the separator may be prevented, and thereby a phenomenon in which an internal short circuit occurs due to contact of the cathode plate and the anode plate caused by shrinkage of the separator may be prevented.

Preferably, the hardened polymer solution 300 is filled in a space called a V-forming space among the internal space of the battery casing 200, that is, a space where a protruding portion of the electrode tab 110 out of the electrode assembly 100 is located.

As described in the foregoing, when the hardened polymer solution 300 is filled in the V-forming space, the electrode tab 110 and the electrode lead 120 present in the V-forming space may be surrounded and fixed by the hardened polymer solution 300. Therefore, the electrode tab 110 and the electrode lead 120 may be protected from an external impact more effectively, and a connected portion of the electrode tab 110 and the electrode lead 120 may be prevented from being damaged. Also, thereby, an internal short circuit caused by damage of the electrode tab 110 or the electrode lead 120 or damage of the connected portion of the electrode tab 110 and the electrode lead 120 may be prevented.

In addition, by filling the V-forming space, the movement of the electrode assembly 100 may be prevented more assuredly, and the protruding separator may be held at this portion, thereby preventing the separator from shrinking more effectively.

Preferably, the hardened polymer solution 300 may be hardened by adding polymer particles to the electrolyte solution, followed by heating and cooling. However, its more detailed description will be provided in the description of a method of manufacturing a secondary battery according to the present disclosure.

The polymer may be a binder polymer. That is, the hardened polymer solution 300 may correspond to a hardened state of a binder polymer solution prepared by adding a binder polymer to the electrolyte solution.

The binder polymer may include polyvinylidene fluoride, polyvinylidene fluoride-co-hexafluoropropylene (PVDF-co-HFP), polyvinylidene fluoride-co-tricholroethylene, polyacrylonitrile, polymethylmethacrylate, styrene butadiene rubber (SBR), carboxymethyl cellulose (CMC), and the like. In particular, in a case of PVDF-co-HFP, the content of substitution of HFP may vary, for example, 5%, 12%, 15%, and the like. Besides, various types of binder polymers may be employed in the present disclosure.

Figure 5:
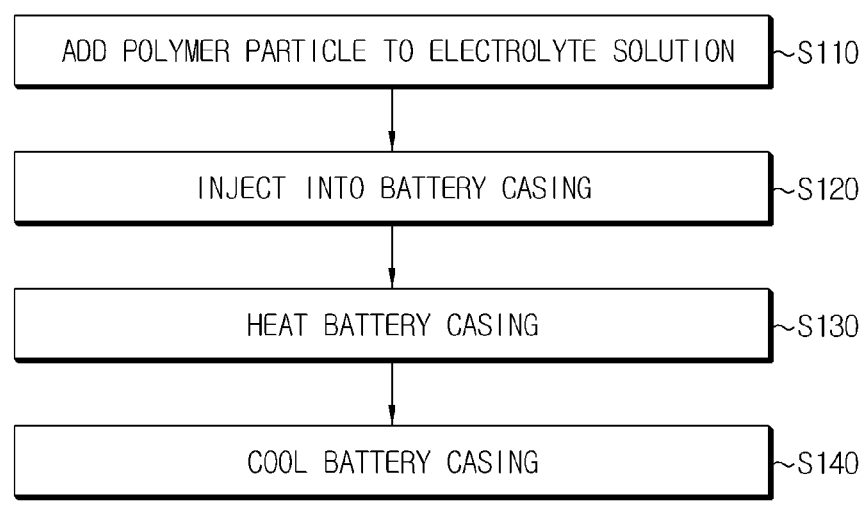
FIG. 5 is a flowchart schematically illustrating a method of manufacturing a secondary battery according to a preferred embodiment of the present disclosure.

FIG. 5 is a flowchart schematically illustrating an exemplary embodiment of a method of manufacturing the secondary battery described in the foregoing.

Referring to FIG. 5, to manufacture a secondary battery according to the present disclosure, first, a polymer slurry is prepared by adding polymer particles to an electrolyte solution (S110). Here, the polymer slurry may be in a state in which polymer particles are mixed in an electrolyte solution in a liquid state.

As the polymer particles, various types of polymer particles may be used if they can form the hardened polymer solution 300 through heating and cooling after mixing with the electrolyte solution.

Preferably, the polymer particles may be a binder polymer particle. Also, the binder polymer may include polyvinylidene fluoride, polyvinylidene fluoride-co-hexafluoropropylene (PVDF-co-HFP), polyvinylidene fluoride-co-trichloroethylene, polyacrylonitrile, polymethylmethacrylate, styrene butadiene rubber (SBR), carboxymethyl cellulose (CMC), and the like.

The polymer particles may have a diameter in a range of 60 μm to 230 μm. In this case, the polymer particles may be prevented from penetrating into the electrode assembly 100, that is, between the cathode or anode plate and the separator, and when heated, may easily form a solution with the electrolyte solution. However, the present disclosure is not limited by a specific size of the polymer particles.

Meanwhile, the electrolyte solution refers to an electrolyte in a liquid state and is well known to an ordinary person skilled in the art pertaining to the present disclosure, and thus a detailed description is omitted herein. Also, according to the present disclosure, as the electrolyte solution for adding the polymer particles, various types of electrolyte solutions known at the time of filing an application for the invention may be employed.

Preferably, in S110, the polymer particles may be mixed in the content of 2 to 15 wt % based on the electrolyte solution. Within this content range, the polymer slurry may be easily changed to a polymer solution when heated, even though the heating temperature is not high, and the properly hardened polymer solution may have a preferred strength. That is, when the concentration is lower than the range, the strength may reduce, and when the concentration is higher than the range, the performance may deteriorate due to resistance of the polymer particles. More preferably, the polymer particles may be mixed in the content of 5 to 11 wt % based on the electrolyte solution. However, the present disclosure is not limited by a specific content ratio range of the polymer particles, and the content ratio of the polymer particles may be different based on various consideration factors, for example, a type of the electrolyte solution, a shape of the battery, and the like.

When the polymer slurry is prepared as described in the foregoing, the polymer slurry is injected into the battery casing 200 in which the electrode assembly 100 is received (S120). In this instance, in the injected polymer slurry, the electrolyte solution penetrates into the electrode assembly 100, in particular, between the cathode plate and the anode plate, whereas the polymer particles do not penetrate into the electrode assembly 100 and are located outside the electrode assembly 100, that is, between the electrode assembly 100 and the battery casing 200. Accordingly, in this state, the electrolyte solution in a liquid state is present in the electrode assembly 100 and the polymer slurry in which the polymer particles are dispersed in the electrolyte solution is present outside the electrode assembly 100.

When the polymer slurry is injected into the battery casing 200 as described in the foregoing, the battery casing 200 is heated (S130). This heating may change the properties of the polymer slurry by providing heat to the polymer slurry. That is, by the provided heat, the polymer slurry located outside the electrode assembly 100 may change from a slurry state to a solution state such as a colloidal solution, that is, a polymer solution. Preferably, in S130, the polymer slurry may change to a polymer solution in a sol state by heating.

For example, in S130, the battery casing 200 may be heated to a temperature higher than or equal to 80° C. However, the present disclosure is not limited by this temperate range, and heating may be performed to any temperature so long as it is within a temperature range not deteriorating the functions of components such as the electrode assembly 100, the electrolyte solution, and the battery casing 200 by heating.

Also, S130 may be performed with aging performed in a general battery manufacturing process.

After the heating step is completed, the battery casing 200 is cooled (S140). This cooling comprises hardening the polymer solution by cooling the polymer solution, and may be performed in a way of placing the battery at room temperature. Preferably, in S140, the polymer solution may be hardened into a gel state by cooling. The polymer solution is located in the space between the inner surface of the battery casing 200 and the electrode assembly 100, and by hardening the polymer solution through this cooling process, an effect that the hardened polymer solution 300 is filled in the space between the inner surface of the battery casing 200 and the electrode assembly 100 may be obtained in the end. For example, a gel polymer produced by hardening through the cooling process may be filled in the V-forming space in which the protruding electrode tab 110 is present.

Preferably, the heating step (S130) and/or the cooling step (S140) of the battery casing 200 may be performed in such a state that a predetermined pressure is applied to the battery casing 200. For example, in such a state that the polymer slurry is received in the electrode assembly 100, heating and cooling of the battery casing 200 may be performed while applying pressure to the battery casing 200 through a press tool such as a jig press. Subsequently, the pressure may be released after cooling is completed and the polymer solution is all hardened. Accordingly, when pressure is applied to the battery casing 200, the polymer slurry may penetrate into the empty space between the electrode assembly 100 and the inner surface of the battery casing 200 more effectively.

In particular, applying the pressure may be preferably performed to fill at least a portion of the hardened polymer solution 300 in the protruding portion of the electrode tab 110 of the electrode assembly 100 within the V-forming space, that is, inside the battery casing 200. For example, a magnitude, a location, or a direction of the pressure applied to the battery casing 200 in S130 may be set to properly locate the polymer slurry in the V-forming space, in consideration of various factors such as shapes of the battery casing 200 and the electrode assembly 100, viscosity of the polymer slurry, and the like.

Meanwhile, in this case, the battery casing 200 may be preferably a pouch-shaped battery casing. In comparison to a can-shaped battery casing, a pouch-shaped battery casing is easy to move the polymer slurry therein through applying pressure.

Hereinafter, a detailed description is provided through an embodiment example and a comparative example to describe embodiments and effects of the present disclosure more specifically. However, it should be understood that embodiments of the present disclosure may be modified in various forms and the scope of the invention is not limited to the following embodiment. The embodiments of the present disclosure are provided to describe the present disclosure to those skilled in the art more completely.

Embodiment Example

After preparing an electrolyte solution, in which 1M $LiPF_6$ is dissolved in an organic solvent including EC, PC, and DEC, and VC, PS, FA, and NA are added thereto, a polymer slurry was prepared by adding PVDF-HFP as polymer particles to the prepared electrolyte solution such that the content of the polymer particles is 10 wt %. Also, the prepared polymer slurry was injected into a battery casing in which an electrode assembly was received, followed by sealing, and the resulting battery casing was heated at 85° C. for 2.5 hours. In this instance, 0.5 Nm pressure was applied to the battery casing using a jig press during heating. Subsequently, the heated battery casing was cooled at room temperature, followed by degassing and re-sealing, thereby manufacturing a secondary battery according to an embodiment example.

For the manufactured secondary battery according to an embodiment example, a 3-point bending test was conducted in 0.8 mm deflection at room temperature, and a force [N] at each point was measured. The result was shown in FIG. 6 as an embodiment example.

Figure 7:
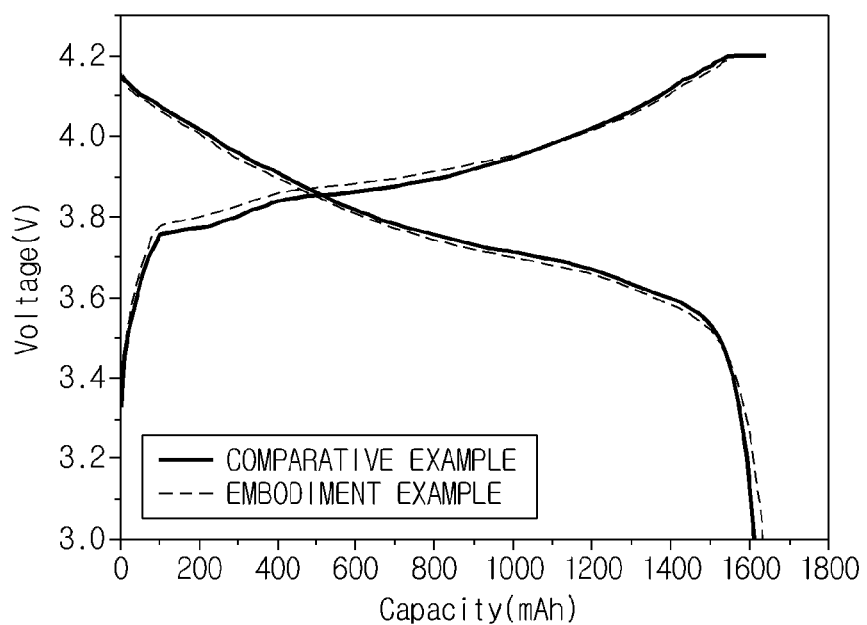
FIG. 7 is a graph illustrating a result of measuring a magnitude of voltage based on a capacity when charging and discharging secondary batteries according to an embodiment example of the present disclosure and a comparative example.

Also, for the manufactured secondary battery according to an embodiment example, voltage was measured during charging and discharging, and the result was shown in FIG. 7 as an embodiment example.

COMPARATIVE EXAMPLE

The same electrolyte solution as the electrolyte solution prepared in the embodiment example was prepared, and the prepared electrolyte solution was injected into a battery casing in which an electrode assembly was received, without addition of polymer particles, followed by sealing. Subsequently, after aging was performed by heating the battery casing at 85° C. for 2.5 hours, the battery casing was cooled at room temperature, followed by degassing and re-sealing, thereby manufacturing a secondary battery according to a comparative example.

For the manufactured secondary battery according to a comparative example, similar to the embodiment example, a 3-point bending test was conducted in 0.8 mm deflection at room temperature, and a force [N] at each point was measured. The result was shown in FIG. 6 as a comparative example.

Also, for the manufactured secondary battery according to a comparative example, similar to the embodiment example, voltage was measured during charging and discharging, and the result was shown in FIG. 7 as a comparative example.

Figure 6:
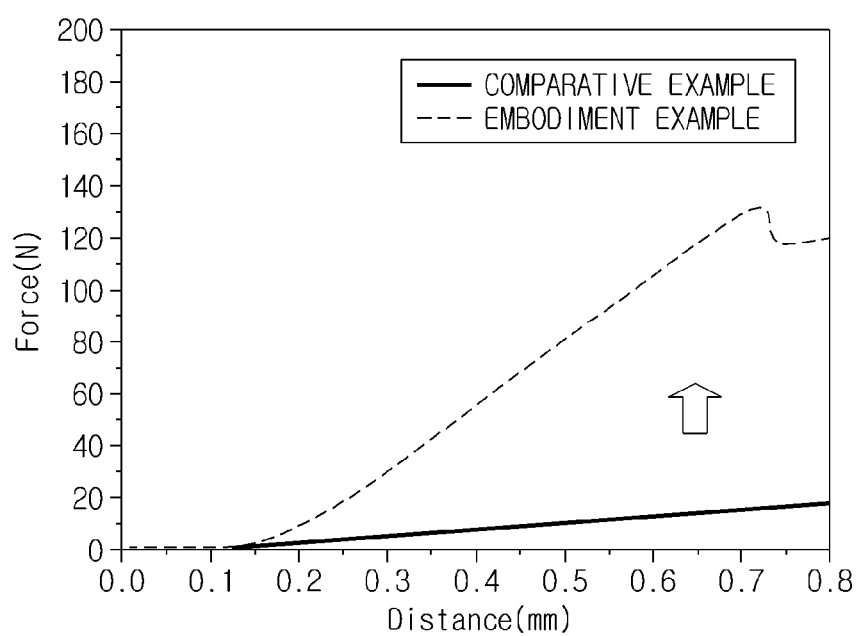
FIG. 6 is a graph illustrating a result of a 3-point bending test on secondary batteries according to an embodiment example of the present disclosure and a comparative example.

First, seeing FIG. 6, an x axis indicates an extent to which the secondary battery is deformed by a distance in mm, and a y axis indicates an amount of force used to deform the secondary battery in N. Referring to the result of FIG. 6, it can be seen that a higher amount of force is required to deform the secondary battery according to an embodiment example of the present disclosure than the secondary battery according to a comparative example. For example, it can be seen that a force of about 5N is required to deform the secondary battery according to a comparative example by 0.4 mm, while a force of about 50N or more is required to deform the secondary battery according to an embodiment example by 0.4 mm. As another example, it can be seen that a force of about 10N is required to deform the secondary battery according to a comparative example by 0.7 mm, while a force of about 130N is required to deform the secondary battery according to an embodiment example by 0.7 mm.

Next, seeing FIG. 7, an x axis indicates a capacity of the secondary battery in mAh, and a y axis indicates a voltage of the secondary battery in V. Referring to the result of FIG. 7, it can be seen that the secondary battery according to an embodiment example of the present disclosure did not deteriorate in its performance even though polymer particles were added to an electrolyte solution. First, when seeing a form of voltage change during charging, in the embodiment example and the comparative example, it is found that there is no great difference in an initial charging voltage and a final charging voltage, and a form of voltage increasing with increasing capacity is mostly similar. Also, when seeing a form of voltage change during discharging, in the embodiment example and the comparative example, it is found that a form of voltage decreasing with decreasing capacity is mostly similar.

Accordingly, as seen from the results of FIGS. 6 and 7, it can be seen that the secondary battery according to the present disclosure did not deteriorate in its performance even though polymer particles were added to an electrolyte solution, but strength was greatly improved. In particular, due to a hardened polymer solution serving as a frame at a V-forming portion and outside an electrode assembly, the secondary battery according to the present disclosure may prevent a short circuit at the V-forming portion and remarkably reduce shrinkage of a separator, as well as greatly improve the strength.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A method of manufacturing a secondary battery, comprising:
   preparing a polymer slurry by adding a polymer particle to an electrolyte solution;
   injecting the polymer slurry to a battery casing in which an electrode assembly is received, so that the electrolyte solution penetrates into the electrode assembly and the polymer particle is disposed between the electrode assembly and the battery casing, wherein the polymer particle does not penetrate into the electrode assembly;
   changing the polymer slurry to a polymer solution by heating the battery casing; and
   hardening the polymer solution by cooling the battery casing.

2. The method according to claim 1, wherein heating and cooling of the battery casing is performed in such a state that a predetermined pressure is applied to the battery casing.

3. The method according to claim 2, wherein applying the predetermined pressure is performed to dispose at least a portion of the polymer solution in a protruding portion of an electrode tab of the electrode assembly within the battery casing.

4. The method according to claim 1, wherein heating of the battery casing is performed to change the polymer slurry to a polymer solution in a sol state.

5. The method according to claim 1, wherein cooling of the battery casing is performed to change the polymer solution to a gel state.

6. The method according to claim 1, wherein the polymer particle is a binder polymer particle.

7. The method according to claim 1, wherein the polymer particle includes at least one of polyvinylidene fluoride, polyvinylidene fluoride-co-hexafluoropropylene (PVDF-co-HFP), polyvinylidene fluoride-co-tricholroethylene, polyacrylonitrile, polymethylmethacrylate, styrene butadiene rubber (SBR), and carboxymethyl cellulose (CMC).

8. The method according to claim 1, wherein the battery casing is a pouch-shaped battery casing.

9. The method according to claim 1, wherein the diameter of the polymer particle is in a range of 60 μm to 230 μm.

* * * * *